United States Patent Office 3,395,465
Patented Aug. 6, 1968

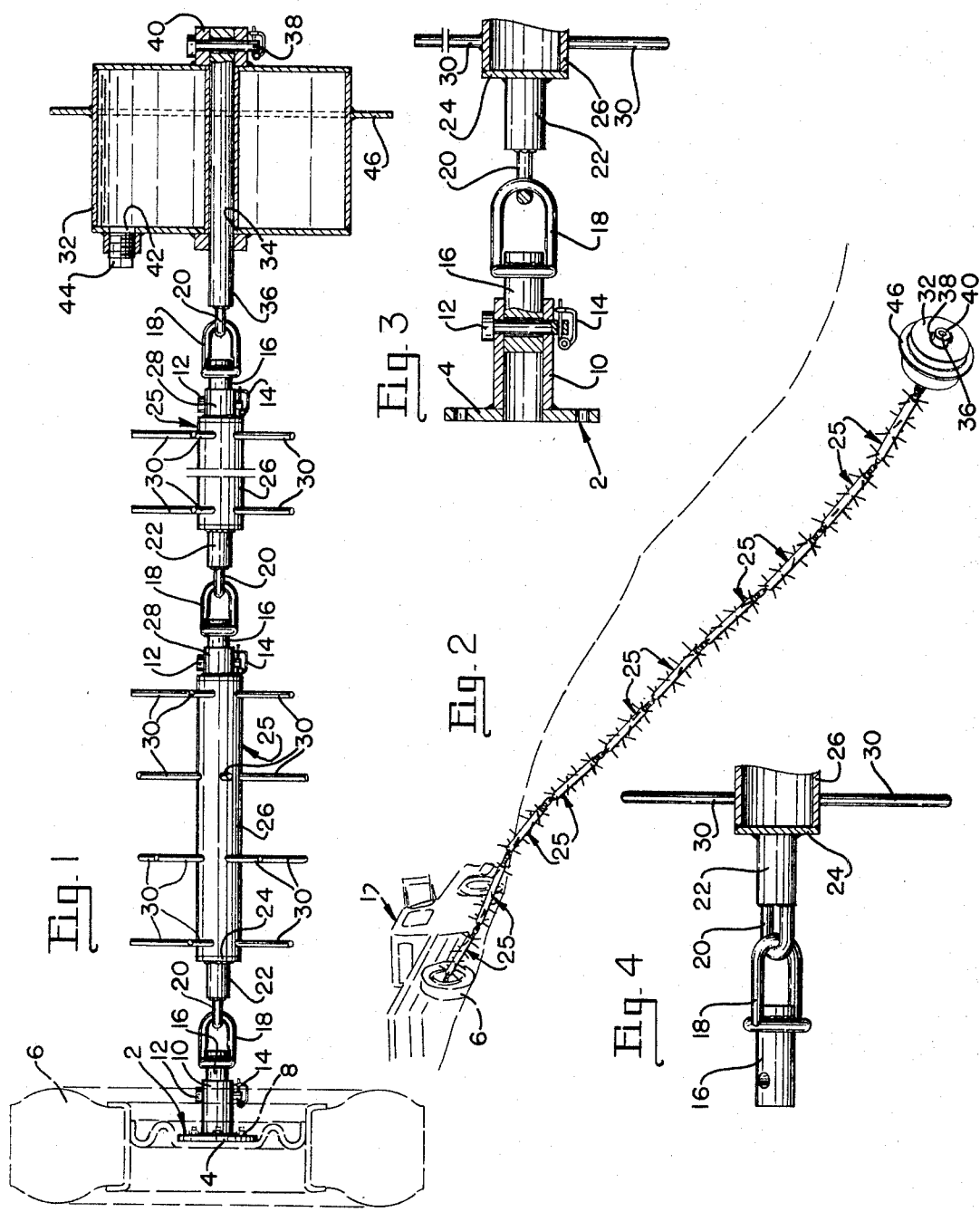

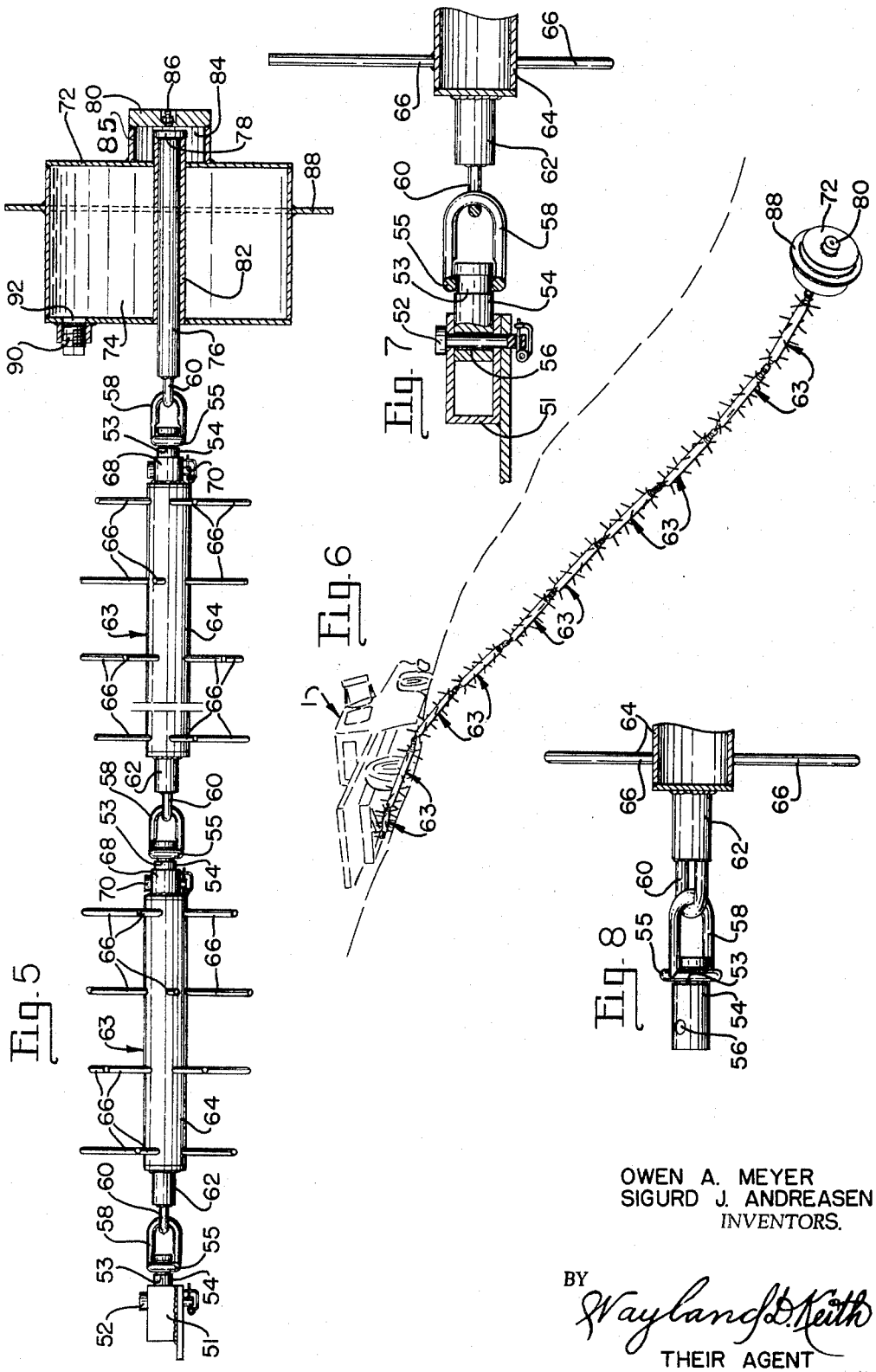

3,395,465
ROTARY RAKE OR SCARIFIER
Sigurd J. Andreasen and Owen A. Meyer, both of P.O. Drawer 630, Bowie, Tex. 76230
Filed May 14, 1965, Ser. No. 455,770
3 Claims. (Cl. 37—2)

ABSTRACT OF THE DISCLOSURE

An elongated relatively flexible, rolling, toothed, rake-like member to be moved along embankments and the like and rotated by means of a traction vehicle wheel to clear the embankment of weeds and brush and to scarify the terrain of the embankment so it will receive sod or seed distributed by the hydraulic planting method. The device is joined in sections to enable the length thereof to be varied. Provision is made for journaling a rolling, liquid weighted member thereto.

---

This invention relates to a rotary rake or scarifier and vegetation disintegrator for use on steep inclines where it is impractical or impossible to operate conventional tractors or other power tools.

In the excavation for highways or in making fills therealong, step embankments are sometimes formed, which, if not sodded with grass or planted with seed, erode rapidly, and since the embankments along highways which are too steep for the use of conventional tractors or power tools, such embankments are often neglected, due to the high cost of manually sodding and tending these by the use of manual labor. It is therefore desirable to clear such embankments by a machine operated tool and to so condition the embankment as to enable grass sod or seed to be planted thereupon by the hydraulic method now being used.

With the use of the present device the clearing of brush, weeds and the like from the slopes along the sides of the highway and preparing these for planting by scarifying the terrain is relatively simple.

An object of this invention is to provide a rotary disintegrator, scarifier and a rake-like device which may be readily moved over rough, inclined terrain in an expeditious manner, as by driving a tractor, truck along the foot of the embankment to be cleared, so as to scarify the terrain for planting grass sprigs and the like simultaneously with the cleaning of the embankment.

Another object of the invention is to provide an elongated, rolling, rake-like member which is held in taut relation along an embankment in such manner that, when moved therealong, it will scarify the terrain.

Still another object of the invention is to provide an elongated, jointed, flexible, toothed element that can be readily attached to a vehicle, which vehicle may be moved along relatively level terrain while operating the elongated, toothed member along an embankment adjacent thereto.

Still another object of the invention is to provide an elongated, flexible toothed-like member which has a rolling element on the lower end thereof, which rolling element may be readily attached to a vehicle to be moved along an embankment with a rolling action in coordinated turning relation to the turning of the vehicle wheel.

Still another object of the invention is to provide an elongated, rotatable, flexible member which is attached axially of a wheel of a vehicle and which is rotatable therewith, with a wheel-like member on the distal end thereof rotating in unison with the vehicle wheel.

Still another object of the invention is to provide an elongated, multi-unit, flexible, toothed member for scarifying an embankment and clearing it of vegetation, which may be readily adjusted in length and which may be readily attached to or detached from a vehicle.

Still another object of the invention is to provide an elongated, flexible toothed member, the teeth of which are free to swivel and rotate with respect to the adjacent members and which has a freely rotatable rolling member on the distal end thereof, which is adapted to be connected to a vehicle in dragging relation so as to scarify or clear an embankment of vegetation.

Still another object of the invention is to provide an elongated, flexible toothed member which is readily attached to or detached from a vehicle and which members, mounting the teeth, will swivel with respect to the adjacent members and rotate with respect thereto.

Another object of the invention is to provide a vehicle operated, rotary toothed scarifier and vegetation disintegrator which is simple in construction, easy to assemble and disassemble, and easy to operate and low in the cost of manufacture and maintenance.

With these objects in mind and others which will become manifest as the description proceeds, reference is to be had to the accompanying drawings in which like reference characters designate like parts in the several views thereof, in which:

FIG. 1 is a longitudinal, elevational view of the rotary rake or scarifier and vegetation disintegrator, with parts broken away, with parts shortened, with parts being shown in section, and showing parts in dashed outline to bring out the details of construction;

FIG. 2 is a perspective view showing a portion of a truck with a rotary rake or scarifier and vegetation disintegrator attached thereto for movement over the terrain, and showing inclined embankment in dashed outline to show the relation of the rotary rake or scarifier and vegetation disintegrator with respect to the terrain;

FIG. 3 is an elevational view with portions broken away and shown in section of the connector adapter for connecting the rotary rake and the like to a hub of a vehicle;

FIG. 4 is an elevational view on an enlarged scale of a connector and of the apparatus, with parts being broken away and shown in section;

FIG. 5 is a view similar to FIG. 1 except an alternate form of the invention is shown, and showing a portion of a vehicle hitch to which the apparatus is attached;

FIG. 6 is a view similar to FIG. 2, but showing the alternate form of the invention attached to the trailer hitch of a truck or the like;

FIG. 7 is an enlarged view similar to FIG. 3, but showing a vehicle hitch associated with the apparatus; and FIG. 8 is a view similar to FIG. 4, but of the alternate form of the invention.

With more detailed reference to the drawings, the numeral 1 designates generally a truck, with which to supply traction power for the present apparatus. The form of the invention as shown in FIGS. 1 through 4 utilizes a wheel adapter attachment member 2, which member 2 has an apertured plate 4 thereon for attachment to the wheel 6 by hub bolts 8. The apertured plate 4 has outwardly extending cylindrical hub portion 10 secured thereto, which cylindrical hub portion is transversely apertured to receive a pin 12 therethrough, as will best be seen in FIG. 3. A safety clip 14 is shown attached to the pin 12, which pin 12 passes through the cylindrical hub portion 10 and through the shank 16 of the rotary rake or scarifier and vegetable disintegrater. The shank 16 has a loop-like member 18 secured thereto as by welding, which loop-like member 18 is connected in looped relation with a looped member 20 on a shank 22 which shank 22 is axially secured to an end of plate 24 which is secured to an end of hollow shaft-like member 26.

The hollow, shaft-like member 26 has a cylindrical member 28 on the opposite end thereof which is similar in construction to the cylindrical hub portion 10 on plate 4. The cylindrical tank-like member 28 receives a pin 16 of a succeeding rotary rake member. It is preferable to have teeth 30 weldably secured in longitudinally spaced apart, circumferential rows, with the teeth being so staggered as to form a series of spirals around the respective hollow, shaft-like members 26, as will best be seen in FIG. 1. By having each of the hollow, shaft-like members 26 so constructed, a series of these as indicated by FIG. 2 may be readily coupled in end-to-end relation to obtain the desired length for the cleaning and scarifying job. A cylindrical tank-like member 32 has an axial opening 34 therethrough, through which opening 34 and axle 36 extends, which axle is preferably transversely apertured at the distal end thereof to receive a pin 38 therethrough and through the hub 40 of the cylindrical tank-like member 32. The cylindrical tank-like member 32 has an opening 42 therein, through which a liquid, such as water, may be introduced to create additional weight therefor. An opening 42 is plugged by screwthreaded plug 44 to retain the water or the like therein. The cylindrical, tank-like member 32 has a circumferential band 46 secured therearound to strengthen the tank and to form a cutter-like member to insure rolling contact of the cylindrical tank-like member 32 with the ground.

The toothed members are generally designated by the numeral 25, which are coupled in end-to-end relation, as shown in FIG. 2, and with toothed members 25 thus coupled the rotary rake or scarifier and vegetable disintegrater may be readily moved over the terrain as each time the wheels 6 of the truck 1 rotates a rotary motion will be imparted to the tooth-like members 25 and to the wheel or tank-like member 32. It is preferable to have the cylindrical, tank-like member 32 of a size to roll along the terrain to cover approximately the same linear distance as is covered by wheel 6. However, it is preferable to have the rolling action of the cylindrical, tank-like member 32 either the same or slightly slower speed as that of wheel 6. If the speed is slower, a dragging action will also take place to keep the cylindrical, tank-like wheel member 32 in close proximity to the space being covered. In this manner the cylindrical, tank-like member 32 will not roll ahead of the truck, and during the movement thereof over the terrain, the various teeth 30 will dig into the surface of the soil and break out small portions of soil to enable grass sprigs and the like to be seeded thereinto by the hydraulic manner of application.

The toothed member 25 may be readily disconnected from the truck or the like for ease in transport and storage, and readily assembled into any length implement needed for the clearing and/or planting of embankments or roadways and the like.

*Alternate form of the invention*

The alternate form of the invention as shown in FIGS. 5 through 8 is very similar in construction to the aforementioned form of the invention. However, the form of the device as shown in FIGS. 5 through 8 is connected to a trailer hitch 51 on the rear end of truck 1 by a pin 52 which passes through the trailer hitch 51 and through an aperture in a pin 54, which pin 54 has a looped member 58 journaled thereon for relative rotation with respect thereto. The pin 54 is transversely apertured as indicated at 56 and is standard on all units. The looped member 58 is in looped engagement with a second looped member 60 weldably secured to outstanding pins 62 on a tubular member 64. The tubular member 64 is similar in construction to the hollow, shaft-like member 26 and has teeth 66 thereon which radiate outward therefrom and are longitudinally spaced apart in circumferential spiral rows, as will best be seen in FIG. 5. The opposite end of the tubular member 64 has a hollow tubular member or socket 68 secured thereto, which is apertured to enable a pin 70 to be passed therethrough and through a transverse aperture in pin 54 to form a connector between complementary members generally designated by the numeral 63. The pin 54 has a groove 53 formed therearound to receive a ring 55, which ring is free to rotate within the groove, but is retained against longitudinal movement with respect to pin 54. The looped member 58 is weldably secured to the ring 55 so that the ring 55 and the looped member 58 are free to turn with respect to pin 54 and looped members 58 and 60 are free to hinge with respect to each other; so when a multiple unit of the rotary rake or scarifier and vegetable disintegrator, generally designated by the numeral 63, is pulled behind a truck or other traction element, designated generally by the numeral 51, and with a weighted, cylindrical tank-like member 72 at the distal end of the rotary rake or scarifier and vegetable disintegrator, and with the chamber 74 within cylindrical tank-like member 72 filled with water or other weighting liquid, the tank 72 will be free to rotate about an axle 76 which is coupled to a looped member 58 through looped member 60. The axle 76 is preferably a headed shaft, which has a head 78 in close proximity to the inner face 80 so as to prevent longitudinal movement of the axle shaft 76 while it is rotating within the tubular bearing 82.

A grease receiving cavity 84 within cylindrical member 85 is closed by the cap 80 and a grease fitting 86 is provided within the cap to permit lubricant to be introduced thereinto. The cylindrical tank-like member 72 has an annular circumferential rib 88 of metal, arranged therearound and upstanding therefrom so that the rib will lie in a plane perpendicular to the axis of the rotary tank-like member 72. A plug 90 is provided for an opening 92 within cylindrical tank-like member 72 to admit filling the hollow portion 74 thereof with a weighting liquid.

It is to be noted that this particular form of the invention may be towed behind a truck or tractor with the rotary rake-like member 63 so that the rotatable tank-like member 72 will extend down the embankment or slope. As the apparatus is dragged along by a truck or tractor element, the teeth 66 will engage the terrain to scoop out pockets in the soil to admit the planting of grass sprigs, seeds and the like by the hydraulic planting method. Furthermore, the terrain will be cleared of dead brush, weeds and other noxious plants as the apparatus is moved thereover.

Having thus clearly shown and described the invention, what is claimed as new and desired to be secured by Letters Patent is:

1. A rotary rake, scarifier and vegetable disintegrator for connection to a vehicle having a wheel, wherein;
    (a) an apertured plate is adapted to be secured to the hub of the vehicle wheel,
    (b) an outwardly extending first connector fitted on said apertured plate,
    (c) a second connector fitted in complemental relation with said first connector,
        (1) means securing said connectors against relative rotation with respect to each other,
        (2) a looped member on the end of said last mentioned connector which complementally engages a second looped member,
    (d) a first elongated cylinder member,
        (1) longitudinally spaced apart circumferential rows of outwardly extending teeth secured to said elongated cylindrical member,
        (2) said second looped member being secured to an end of said first elongated toothed cylindrical member,
        (3) said first cylindrical member having a connector on the opposite end thereof to connect with a complementary adapter member on an end of a second toothed cylindrical member,
        (4) at least a third toothed cylindrical member having like connector means on an end thereof to connect to said second toothed cylindrical member, which cylindrical members connect in hinged relation and are secured against rotary and longitudinal movement with respect to each other, (e) means interengaging said connectors to prevent relative movement therebetween, and (f) a tank-like member hingably attached to the distal end of last of said elongated tubular members and secured thereto against longitudinal movement or relative rotation.

2. A rotary rake, scarifier and vegetable disintegrator for connection to a vehicle having a wheel, as defined in claim 1, wherein;

(a) each of said elongated, toothed cylindrical members has the interconnecting looped members fixedly secured to one end thereof, each of which looped members has an outwardly extending connector pin thereon, (1) each said pin is fixedly secured against relative rotation with respect to said elongated, toothed cylindrical members, (2) the opposite end of each respective elongated toothed cylindrical member having a tubular member secured therein to form a recess to complementally receive one of said pins therein, and (3) said tubular member forming said recess and said pin adapted to be received into the tubular recess each being transversely apertured to complementally receive one of said pins therethrough.

3. A rotary rake, scarifier, and vegetation disintegrating device for connection to a traction element, which device comprises;

(a) a series of elongated, toothed cylindrical members, (1) a looped member secured to one end of each cylindrical, toothed member and being rotatable therewith, (2) a second looped member connected in hinged relation with said first looped member and having the ends thereof connected to a ring, (3) a pin having an annular groove formed therein, (4) said ring being fitted in said groove in said pin and being rotatable therewith, (5) means securing said pin to an end of another toothed, cylindrical member in complementary relation to form said series of elongated, toothed cylindrical members, (b) a connector means connecting one end of one of said toothed cylindrical members to the traction element, and (c) the distal end of the outermost of said series of toothed, cylindrical members being connected to a wheel-like member for independent rotation with respect to said toothed cylindrical member.

References Cited

UNITED STATES PATENTS

| | | | |
|---|---|---|---|
| 2,751,736 | 6/1956 | Hessemer | 37—2 X |
| 2,825,983 | 3/1958 | Finn | 37—2 |
| 1,278,758 | 10/1918 | Sahlberg | 172—121 X |
| 2,093,070 | 9/1937 | Bloom et al. | 172—44 |
| 2,974,616 | 3/1961 | Pawela | 172—121 X |

ABRAHAM G. STONE, *Primary Examiner.*

A. E. KOPECKI, *Assistant Examiner.*